G. A. PETERSON.
APPARATUS FOR TRANSFORMING PRESSURE.
APPLICATION FILED AUG. 26, 1912. RENEWED JUNE 5, 1917.

1,253,718.

Patented Jan. 15, 1918.
8 SHEETS—SHEET 1.

FIG. 1.

WITNESSES
H. J. Pret.
H. A. Scholten

INVENTOR
G. A. PETERSON
By Miller & White
HIS ATTORNEYS

G. A. PETERSON.
APPARATUS FOR TRANSFORMING PRESSURE.
APPLICATION FILED AUG. 26, 1912. RENEWED JUNE 5, 1917.

1,253,718.

Patented Jan. 15, 1918.
8 SHEETS—SHEET 2.

FIG. 2.

WITNESSES
H. G. Prost.
H. A. Scholten

INVENTOR
G. A. PETERSON
By Miller & White
HIS ATTORNEYS

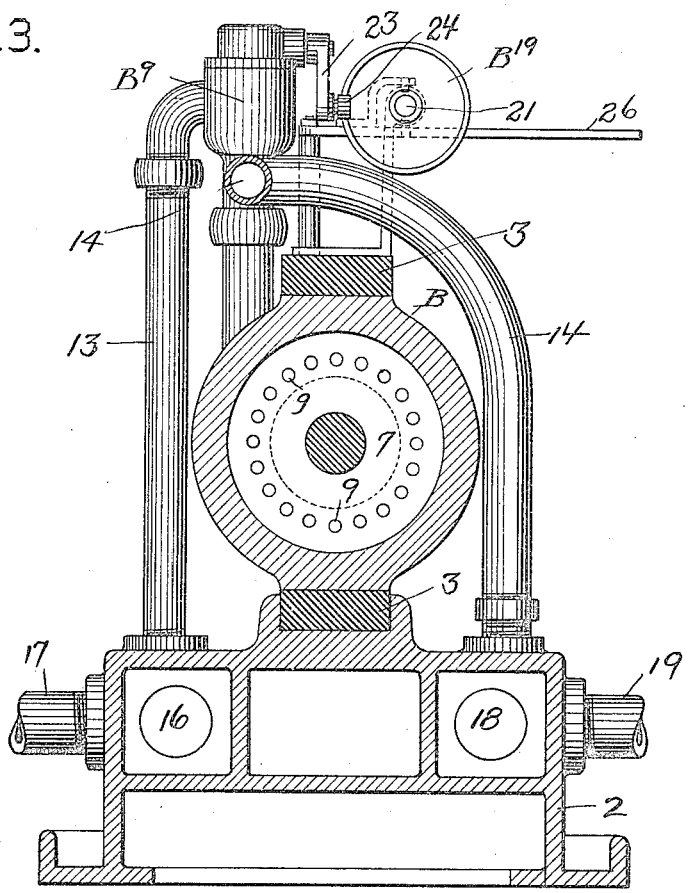

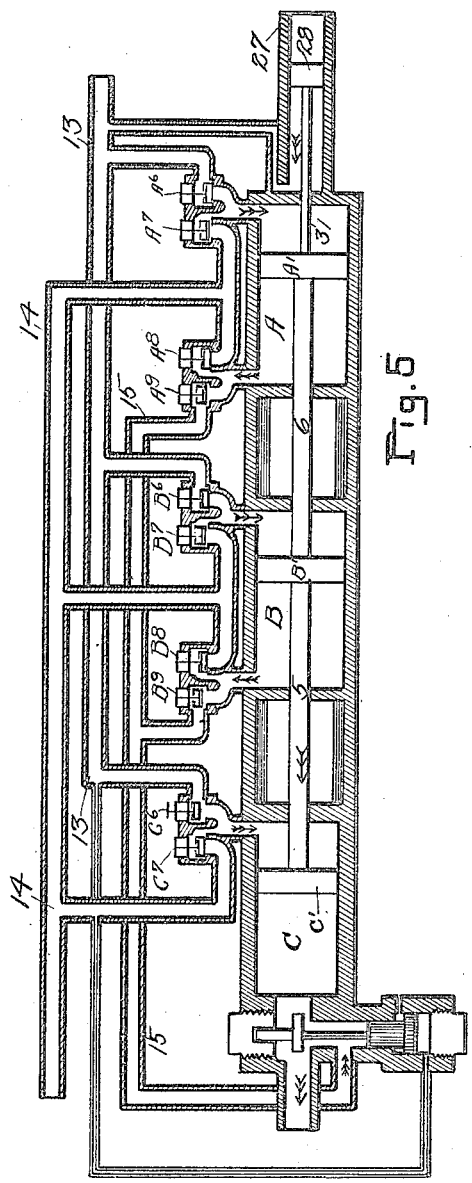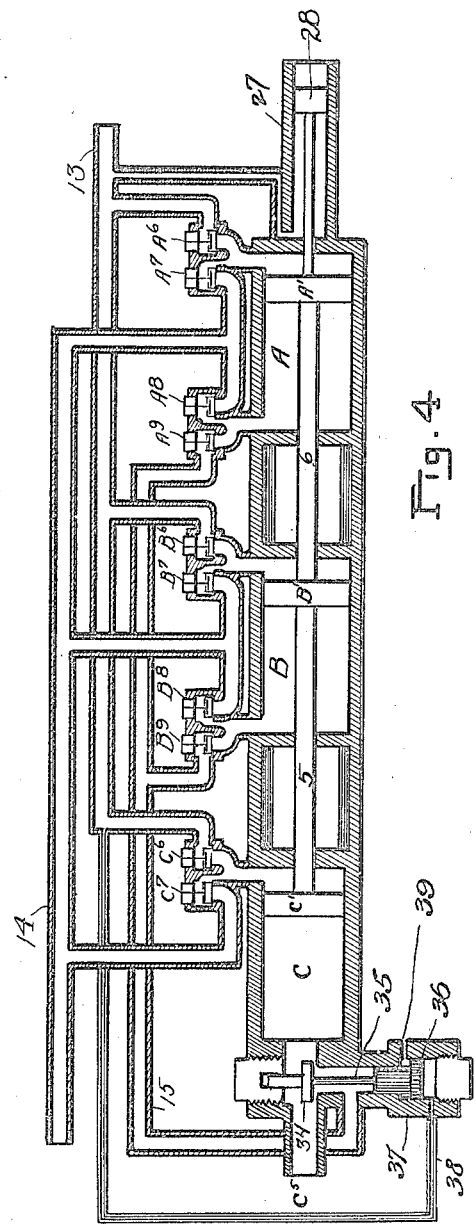

G. A. PETERSON.
APPARATUS FOR TRANSFORMING PRESSURE.
APPLICATION FILED AUG. 26, 1912. RENEWED JUNE 5, 1917.
1,253,718.
Patented Jan. 15, 1918.
8 SHEETS—SHEET 5.
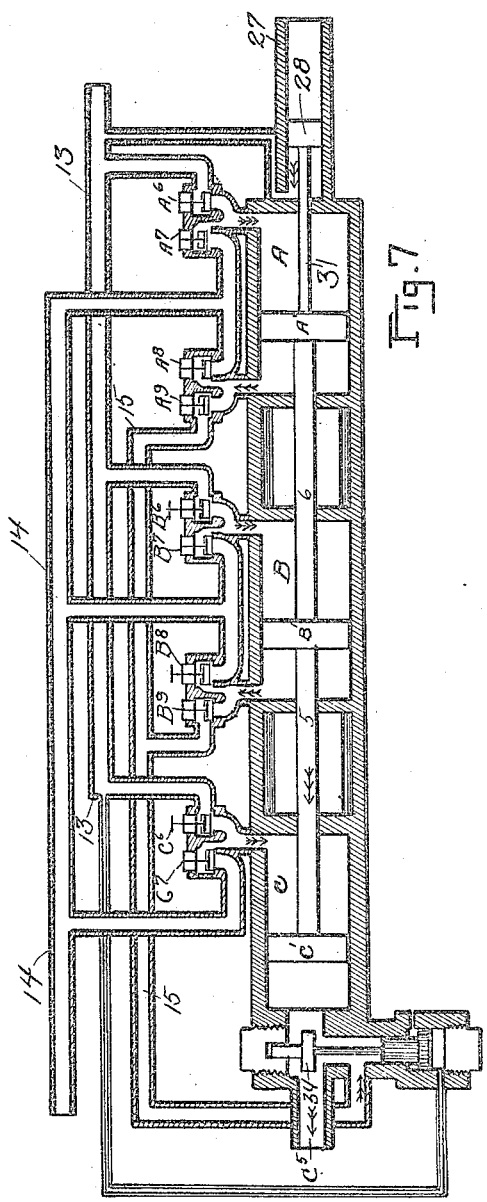
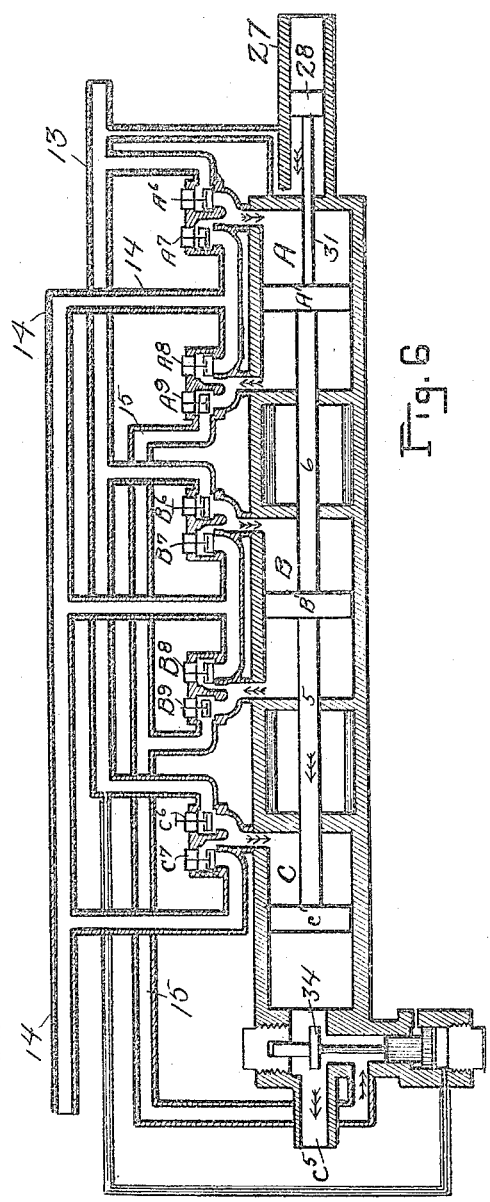
WITNESSES
INVENTOR
G. A. PETERSON
HIS ATTORNEYS

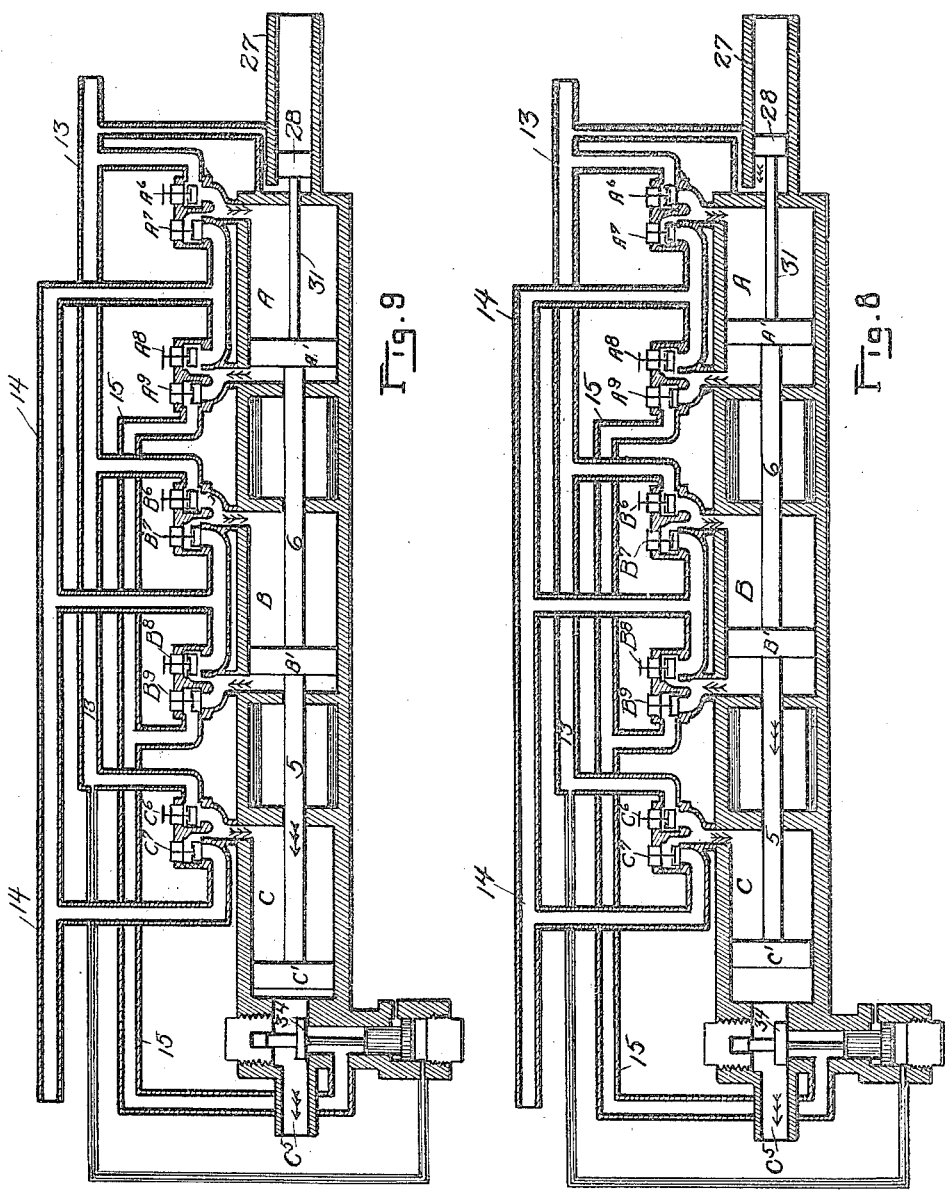

G. A. PETERSON.
APPARATUS FOR TRANSFORMING PRESSURE.
APPLICATION FILED AUG. 26, 1912. RENEWED JUNE 5, 1917.
1,253,718.
Patented Jan. 15, 1918.
8 SHEETS—SHEET 7.
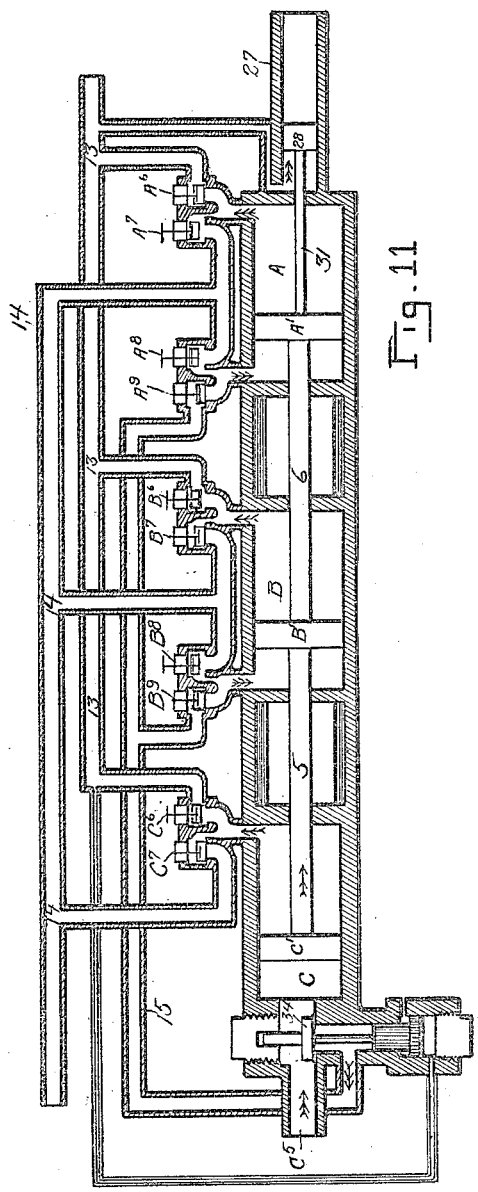
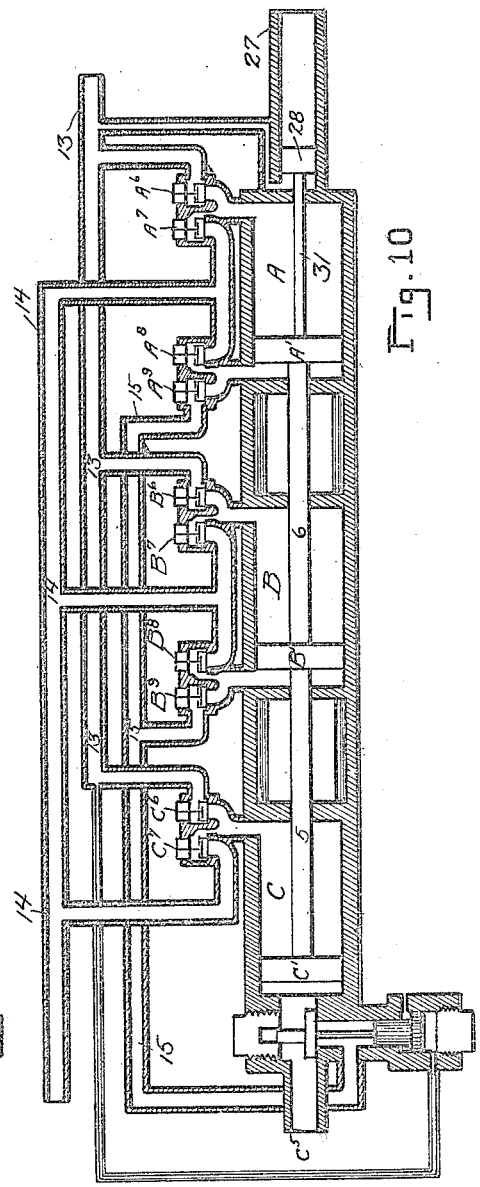
WITNESSES
INVENTOR
G. A. PETERSON.
HIS ATTORNEYS

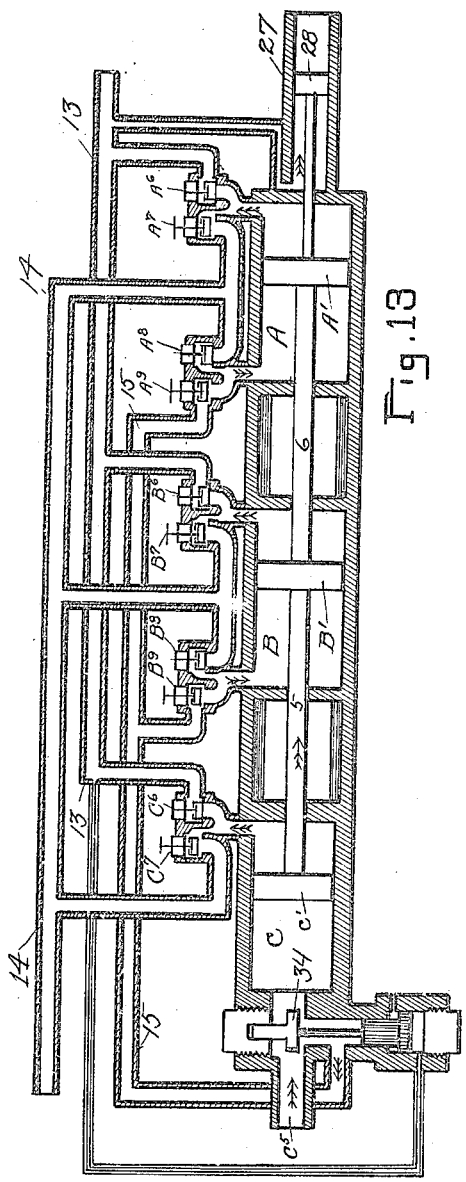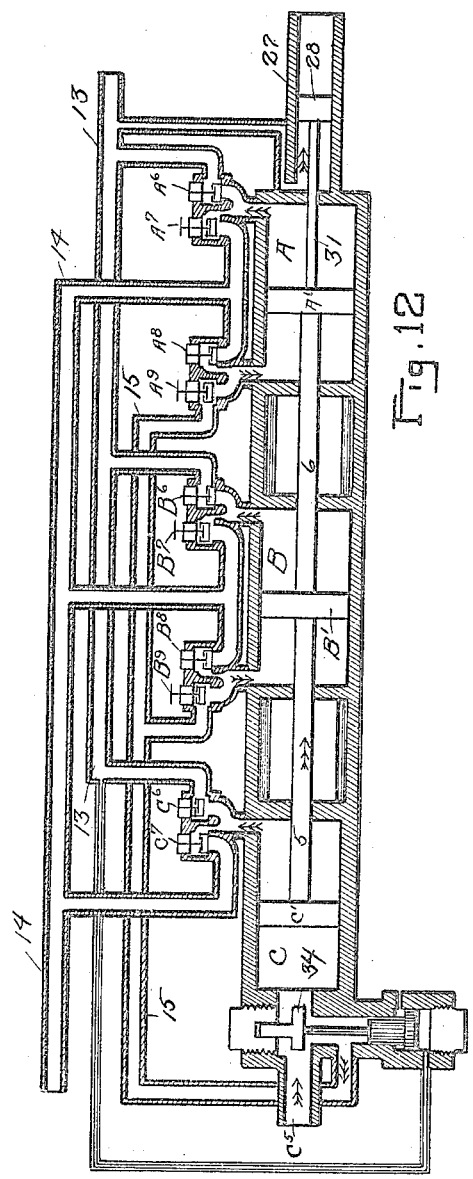

UNITED STATES PATENT OFFICE.

GEORGE A. PETERSON, OF OAKLAND, CALIFORNIA.

APPARATUS FOR TRANSFORMING PRESSURE.

1,253,718.  Specification of Letters Patent.  Patented Jan. 15, 1918.

Application filed August 26, 1912, Serial No. 717,011. Renewed June 5, 1917. Serial No. 173,058.

*To all whom it may concern:*

Be it known that I, GEORGE A. PETERSON, a citizen of the United States, and a resident of Oakland, in the county of Alameda and State of California, have invented certain new and useful Improvements in the Apparatus for Transforming Pressure, of which the following is a specification.

The invention relates to an apparatus for transforming pressure above and below the impressed pressure.

Another object of the invention is to provide an apparatus which operates to transform a constant pressure into a continuous increasing pressure.

Another object of the invention is to provide an apparatus which operates as a step-down and step-up pressure transformer to convert a given pressure into a variable pressure having its maximum and minimum limits above and below the given pressure.

A further object of the invention is to provide a pressure transformer which is automatic in action to transform a constant pressure into a continuous increasing pressure.

The apparatus is designed to transform a constant fixed hydraulic pressure into a variable increasing hydraulic pressure. It is particularly applicable to be used in connection with hydraulically operated presses and similar apparatus which are used for compressing material into smaller volume. The action of a hydraulically operated press is such that it requires equal amounts of water to be introduced behind the press plunger for equal portions of the stroke. That is, in a press having a cylinder of 100 square inches area, it requires 100 cubic inches of water to move the plunger one inch, regardless of whether the plunger is at the beginning or the end of its stroke. In compressing materials, however, it generally requires less pressure to initially compress the material than it does to finally compress it. For example, in compressing a block of un-set concrete from a thickness of eight inches to a thickness of five inches, it will require much less pressure to reduce the thickness from eight inches to seven inches, than it will to reduce the thickness from six inches to five inches. Assuming that it requires a pressure of 1,000 pounds per square inch to compress the block from eight inches to seven inches, 2,000 pounds per square inch to compress from seven inches to six inches, and 3,000 pounds per square inch to compress from six inches to five inches, under the old method of operating the press, 300 cubic inches of water at a pressure of 3,000 pounds per square inch would be introduced behind the plunger, consuming 900,000 inch pounds of energy. Under the present method, however, 100 cubic inches of water at 1,000 pounds, 100 cubic inches at 2,000 pounds and 100 cubic inches at 3,000 pounds, representing 600,000 inch pounds of energy will be employed. The increase in pressure necessary is not directly proportional to the distance compressed and only a small portion of water at the maximum pressure is necessary. In actual practice, using a pressure transformer as shown to obtain the continuous increasing pressure, it is necessary to employ only about 20 per cent. of the energy employed in the old method to obtain the same result.

The invention possesses other advantageous features, which, with the foregoing, will be set forth at length in the following description, where I shall outline in full that form of the apparatus selected for illustration in the accompanying drawings, in which:

Figure 1 is a side elevation of the apparatus, partly in section.

Fig. 2 is a plan or top view of the apparatus.

Fig. 3 is a transverse vertical section of the apparatus.

Figs. 4 to 13 inclusive are diagrammatic representations of the operation of the apparatus; Fig. 4 showing the apparatus at rest; Fig. 5, the first step in its operation; Fig. 6, the second; Fig. 7, the third; Fig. 8, the fourth; Fig. 9 shows the apparatus stepping up to its maximum pressure; Fig. 10, the apparatus at rest at the end of the operation; and Fig. 11, the apparatus returning to its initial position; Fig. 12, the second step in returning to its initial position and Fig. 13, the third step in returning to its initial position.

The apparatus consists of a base or bed 2 upon which the working parts are arranged. The base is generally an elongated structure, its dimensions depending upon the capacity and ratio of transformation of the apparatus, provided preferably with two separate compartments or chambers, the use of which will be hereinafter set forth. Arranged upon the base are a plurality of alined cylinders A, B, and C, secured together and to the base by the plates or bars 3, arranged above and below the cylinders and to which the cylinders are secured by the keys or wedges 4. The cylinder C is preferably made of smaller diameter than A or B, so that a greater ratio of transformation is obtained.

Arranged in the cylinders are the pistons A'—B'—C', which are connected together by the piston rods 5 and 6. The piston rod 5 connecting pistons C' and B' passes through stuffing boxes $C^2$ and $B^3$ in the ends or headers 8 of cylinders C and B respectively, and the piston rod 6 connecting pistons B' and A' passes through stuffing boxes $B^2$—$A^3$ in the ends or headers 8 of cylinders B and A respectively. The headers are preferably screwed into the cylinder ends, so that a tight joint is obtained, and are made of sufficient strength to adequately withstand the pressure within the cylinders.

Formed integral with each header and spaced apart from the inner face thereof is a flange 7 of substantially the same diameter as the inner diameter of the cylinder. These flanges are provided with a plurality of small holes 9, thereby acting as strainers to prevent any large pieces of foreign material from entering the cylinders.

The cylinders A and B are provided at each end, and the cylinder C at one end, with ports $A^4$ and $A^5$, $B^4$ and $B^5$ and $C^4$ respectively, which are arranged between the flange 7 and the header, and through which the water passes in and out of the cylinders as the apparatus operates. The cylinder C is provided at its other end with a passage $C^5$ through which the water passes in and out of that end of the cylinder. Arranged on each of the ports $A^4$, $A^5$, $B^4$, $B^5$ and $C^4$ are two valves $A^6$, $A^7$, $A^8$, $A^9$—$B^6$, $B^7$, $B^8$, $B^9$—$C^6$, $C^7$, which control the passage of water through their respective ports. The valves $A^6$—$B^6$—$C^6$, are arranged in the conductor 13 which communicates with a source of water under pressure. The valves $A^7$, $A^8$, $B^7$, $B^8$, and $C^7$ are arranged in the conductor 14 which communicates with a source of water under atmospheric pressure. The valves $A^9$ and $B^9$ are arranged in the conductor 15 which communicates with the passage $C^5$ which is connected to the cylinder of a press or other instrumentality in which the power is to be employed. For the sake of convenience, conductor 13 will be hereinafter designated the power pipe; conductor 14 the slack water pipe and conductor 15 the press pipe. The power pipe 13 communicates with the chamber 16 in the base of the apparatus, to which chamber water under pressure is supplied through the conductor 17. The slack water pipe 14 communicates with the chamber 18 in the base, to which water is supplied through conductor 19.

It is evident that when water under pressure is being forced into the press pipe 15, the pistons are moving to the left in Fig. 1, and for convenience, I shall designate that part of each cylinder to the left of the piston as the forward chamber and that part to the right of the piston as the rear chamber.

The various valves which control the passage of the water into and out of the chambers in the cylinders are of the balanced type, as shown in my application Serial No. 702,925, filed June 10, 1912, and require a small amount of power for their operation. The valves are controlled by cams $A^{16}$, $A^{17}$, $A^{18}$, $A^{19}$, $B^{16}$, $B^{17}$, $B^{18}$, $B^{19}$, $C^{16}$ and $C^{17}$, mounted on the shaft 21 which is turned by the hand wheel 22. The valves are each provided with a spring held arm 23 provided with a roller 24 which bears against the surface of the cam. The various cams are arranged on the shaft in such relation to each other, that as the shaft is turned the valves are opened and closed at the proper time to produce the desired operation of the apparatus, which will be hereinafter described. Means are provided for simultaneously closing all of the valves for stopping the operation of the apparatus in case of accident or other reasons. The shaft 21 upon which the cams are arranged is slidable longitudinally in its bearings. Engaging a collar 25 on the shaft is a lever 26 by means of which the shaft is moved longitudinally to remove the cams from contact with the rollers 24 and close the valves. The valves are of such construction that the valve plugs lift automatically with an increase of pressure thereunder, thereby allowing the water to readily pass out of those ends of the cylinders toward which the pistons are moving, under the action of the water being admitted at the other end. This construction obviates the necessity of timing the valves at the opposite ends of each cylinder to operate simultaneously a feature which would render the apparatus very difficult of operation. This construction also operates to compensate for any leakage past the pistons and maintains both chambers constantly filled. It is necessary, therefore, to construct the valve operating cams so that they will operate to open the respective valves only at such times as it is desirable to introduce water into the cylinders.

It is evident also that the initial pressure produced by the transformer may be any pressure within the range of the apparatus. This is accomplished by sliding the cam shaft 21 to bring the cams out of operative relation with the valves, then revolving the shaft to bring the cams into any desired position, and then sliding the shaft to bring the cams into operative relation with the valves. It is evident that by rotating and sliding the cam shaft, any desirable sequence of pressures within the range of the apparatus may be obtained.

Provision is also made for returning the pistons to their initial position after the forward stroke has been completed. Formed integral with the header at the rear end of cylinder A is a cylinder 27 of smaller diameter than the other cylinders of the apparatus and of substantially the same length of such cylinders. Arranged in the cylinder 27 is a plunger 28 provided at its outer end with a cross head 29 to which are secured the connecting rods 31, which pass through stuffing boxes in the header and are secured to the piston A'. The forward end of the cylinder 27 is constantly in communication with the power chamber 16 in the base, through the pipe 32 and the port 33. As the pistons are moved forward, such motion is partly resisted by the water in cylinder 27, but on account of the relatively small area thereof, such resistance is not appreciable.

Provision is also made for preventing the valves from being subjected to the excessive pressure obtained by the operation of the apparatus toward the end of the stroke of the pistons. Arranged between the press pipe 15 and the conductor $C^5$ is a check valve 34. This check valve is lifted to establish communication between the two conductors by means of the stem 35 fixed in the plunger 36. The plunger is of substantially the same area as the check valve, and is arranged in a cylinder 37, which is in constant communication, below the plunger, with the source of water under pressure, or power water, through the conductor 38. The chamber in the cylinder above the plunger is in communication with the atmosphere through port 39. It is evident that when the pressure in conductor $C^5$ becomes greater than the pressure of the power water that the plunger 36 will be depressed and the valve 34 seated, thereby isolating pipe 13 from communication with the press. On the return stroke of the pistons, the valve 34 is opened, as soon as the pressure in conductor $C^5$ is lowered.

The operation of the apparatus is as follows: For convenience, I will assume that the cylinders A, B, and C are of the same diameter and will disregard the effect upon the pressure obtainable of the plunger 28 and the diameters of the piston rods. I shall also assume that the pressure of the power water is 1000 pounds per square inch.

In Fig. 4, the apparatus is shown at rest, all of the valves being closed with the exception of check valve 34, and the water in the cylinders being at atmospheric pressure, or slack water. In the first step in the operation as shown in Fig. 5, valves $A^7$, $A^9$, $B^7$, $B^9$, and $C^6$, are opened. This operation places the rear end of cylinders A and B in communication with the slack water pipe 14; the forward end of cylinders A and B in communication with press pipe 15 and conductor $C^5$, and the rear end of cylinder C in communication with the power pipe 13. The result is that for the introduction of a given amount of water at 1000 pounds into the transformer, three times as much water at 333 pounds is forced into the press cylinder.

In the second step, as shown in Fig. 6, the valves remain the same with the exception that valve $B^7$ is closed and valve $B^6$ is opened, thus placing the rear end of cylinder B in communication with the power water instead of the slack water. Power water at 1000 pounds pressure is therefore being driven into the rear ends of cylinders B and C and water is being ejected from the forward ends of the three cylinders at 666 pounds pressure.

In the third step, as shown in Fig. 7, the valves remain the same with the exception that valve $B^9$ is closed, and valve $B^8$ is opened. This places the forward end of cylinder B in communication with slack water instead of with the press pipe. Power water is admitted to the rear ends of cylinders B and C, and press water ejected from the forward ends of cylinders A and C. The result is that a given amount of power water at 1000 pounds forces the same amount of water at 1000 pounds into the press cylinder.

In the fourth step, as shown in Fig. 8, valve $A^9$ is closed and valve $A^6$ is opened, thereby placing the forward end of cylinder A in communication with the slack water pipe instead of with the press pipe. The cylinders are therefore no longer in communication with the press pipe, the water being ejected from cylinder C through the passage $C^5$ only. The pressure in this passage is, therefore, above that of the power water and the check valve 34 closes. Power water is now entering the rear ends of cylinders B and C and the water for the press cylinder is being ejected from the forward part of cylinder C. Both sides of cylinder A are connected to slack water, making the pressure in passage $C^5$ equal 2000 pounds per square inch.

In the fifth step, as shown in Fig. 9, valve $A^7$ is closed and valve $A^6$ is opened, placing the rear end of cylinder A in communication with the power water instead of with the slack water. Power water at 1000 pounds is therefore being introduced into the rear ends of cylinders A, B, and C and the forward end of cylinder C only, is in communication with conductor C⁵, producing therein a pressure of 3000 pounds per square inch.

In the sixth step shown in Fig. 10 valves A⁶, A⁸, B⁶, B⁸ and C⁶ are closed, thus closing all of the valves and leaving the apparatus at rest with 3000 pounds per square inch pressure in conductor C⁵ and the press cylinder.

In the seventh step shown in Fig. 11, valves A⁷ and A⁸ are opened, placing both ends of cylinder A in communication with slack water. Valve B⁸ is opened, placing the forward end of cylinder B in communication with slack water. Valves B⁶ and C⁶ are also opened, placing the rear ends of cylinders B and C in communication with the power water. The water in the forward end of cylinder C being at 3000 pounds pressure, and the water in the rear ends of cylinders C and B being at 1000 pounds pressure, it is evident that the pistons will move backward until the pressure in C⁵ equals 2000 pounds. This backward movement of the piston forces the displaced water back into the power line, thereby conserving the energy thereof. It is evident that at a pressure of 3000 pounds per square inch, the water is compressed into a smaller volume and the conductors are expanded, so that when the pressure is released, the power represented by the compressed water and extended conductors forces considerable water back into the power line, thereby not only conserving such power but also harmlessly absorbing the recoil due to the highly compressed water.

In the eighth step, shown in Fig. 12, valve B⁶ is closed and valve B⁷ opened, placing the rear end of cylinder B in communication with slack water. Valves B⁸ and A⁸ are closed and valves A⁹ and B⁹ are opened, placing the forward ends of cylinders A and B in communication with the press pipe. The pressure of the water at 2000 pounds in conductor C⁵ moves the pistons backward, forcing the water in the rear end of cylinder C into the power pipe. When the pressure in conductor C⁵ drops to 1000 pounds, the check valve 34 is opened, introducing water at 1000 pounds into the forward ends of cylinders A and B, thus forcing the pistons backward, and forcing more water out of the rear end of cylinder C into the power pipe. The pressure in the press pipe drops to 333 pounds.

In the ninth step, shown in Fig. 13, valve C⁶ is closed and valve C⁷ is opened, placing the rear end of cylinder C in communication with slack water. The pressure on the rear sides of the pistons has now been removed and the pistons are brought back to their initial position by the plunger 28 operating in cylinder 27. When the initial position is reached, the valves are all closed and the apparatus is at rest, as shown in Fig. 4.

It is evident that the number of cylinders employed in the apparatus may be varied depending upon the range of transformation desired. The valve operating cams may also be arranged to produce any sequence of steps which may be desired. In the present embodiment, employing three cylinders and water at 1000 pounds per square inch pressure in the power line, pressures 333, 666, 1000, 2000 and 3000 pounds per square inch are produced in the discharge pipe C⁵. The entire operation of the apparatus takes place in the time necessary to revolve the cam shaft, which in actual practice is accomplished in approximately two seconds. The material to be compressed in the press is more readily compressible at the beginning of the pressing operation than at the end, so that the pistons in the transformer move a greater distance in the first steps than they do in the last steps, thereby utilizing less water from the power line than if the distance moved for each step was equal.

I claim:

1. A pressure transformer comprising a plurality of cylinders of substantially equal diameter having ports at both ends, a piston in each cylinder, means rigidly connecting the pistons together, a power pipe, a slack water pipe and a press pipe, said pipes being connected to said cylinders, and means for controlling the flow of liquid into and out of the cylinders through said pipes.

2. A pressure transformer comprising a plurality of cylinders of substantially equal diameter, ports at the opposite ends of said cylinders, a piston in each of said cylinders dividing each cylinder into forward and rear chambers, means rigidly connecting said pistons together, means for introducing water under a fixed pressure into the rear chambers of said cylinders, means for controlling the introduction of said water and a discharge pipe connecting the forward chambers of said cylinders.

3. A pressure transformer comprising a plurality of alined cylinders of substantially equal diameter arranged in a fixed relation to each other, a piston in each cylinder dividing the cylinders into forward and rear chambers, piston rods rigidly securing said pistons together so that they move simultaneously, ports at the opposite ends of the cylinders, means for introducing water under pressure into said rear chambers to move the pistons forward, a conductor connected to the forward chambers, means for controlling the passage of water into the rear chambers, and means for moving the pistons backward.

4. A pressure transformer comprising a plurality of alined cylinders arranged in a fixed relation to each other, a piston in each cylinder dividing the cylinders into forward and rear chambers, piston rods rigidly securing said pistons together, ports at opposite ends of the cylinders, a slack water pipe connected to the rear port of the forward cylinder and the forward ports and rear ports of the remaining cylinders, a press pipe connected to the forward ports of said cylinders and valves arranged between the rear chamber of the forward cylinder and said slack water pipe and between both chambers of the remaining cylinders and said pipe.

5. A pressure transformer comprising a plurality of alined cylinders of substantially equal diameter arranged in a fixed relation to each other, a piston in each cylinder dividing the cylinders into forward and rear chambers, said pistons being rigidly connected together, means for introducing water under a fixed pressure into one or more of said rear chambers, means for discharging water from the forward chambers and means for controlling the discharge of said water from each cylinder.

6. A pressure transformer comprising a plurality of alined cylinders arranged in a fixed relation to each other, pistons in said cylinders dividing the cylinders into forward and rear chambers, means rigidly connecting said pistons together, ports at the opposite ends of said cylinders, a conductor extending to a source of water under pressure connected to the rear ports, valves arranged between said conductor and said ports, a conductor extending to a source of slack water connected to the rear port of the forward cylinder and the front and rear ports of the remaining cylinders, valves arranged between said slack water conductor and said ports, a conductor for discharging water from said transformer connected to the forward ports and valves between said discharge conductor and the forward ports of the cylinders other than the forward cylinder.

7. A pressure transformer comprising a plurality of alined cylinders arranged in a fixed relation to each other, pistons in said cylinders, means rigidly securing said pistons together, means for introducing and discharging power water, slack water and press water to and from the opposite ends of said cylinders, valves for controlling the inlet and discharge to and from said cylinders and cams for operating said valves.

8. A pressure transformer comprising a plurality of alined cylinders arranged in a fixed relation to each other, pistons in said cylinders, means rigidly securing said pistons together, means for introducing and discharging power water, slack water and press water to and from the opposite ends of said cylinders, valves for controlling the inlet and discharge to and from said cylinders, a shaft arranged adjacent said valves, cams on said shaft adapted to operate said valves, and means for rotating the shaft.

9. A pressure transformer comprising a plurality of cylinders arranged in a fixed relation to each other, pistons in said cylinders, means rigidly securing said pistons together, means for introducing and discharging water to and from the opposite ends of said cylinders, valves controlling the inlet and discharge to and from said cylinders, a shaft arranged adjacent said valves, cams on said shaft arranged to operate said valves, means for revolving the shaft and means for moving the shaft longitudinally to withdraw the cams from operative relation with said valves.

10. A pressure transformer comprising a plurality of alined cylinders arranged in a fixed relation to each other, pistons in said cylinders, means rigidly securing said pistons together, ports arranged at the opposite ends of said cylinders, a conductor connecting the forward ports of the cylinders with the forward port of the forward cylinder, and a check valve between said conductor and said last named port.

11. A pressure transformer comprising a plurality of alined cylinders arranged in a fixed relation to each other, pistons in said cylinders, means rigidly securing said pistons together, ports arranged at the opposite ends of said cylinders, a conductor communicating with a source of water under pressure connected to the rear ports of said cylinders, a conductor connecting the forward ports of said cylinders with the forward port of the forward cylinder, a valve arranged between said conductor and said last named port and means operated by the pressure of water in said source for opening said valve.

12. In a pressure transformer, a plurality of cylinders arranged in a fixed relation to each other, pistons in said cylinders, means rigidly connecting said pistons together, means for introducing water under pressure into the cylinders behind the pistons, means for discharging water from the chambers in the cylinders in front of the pistons, a discharge conductor and means for varying the number of cylinders in communication with said discharge conductor.

13. In a pressure transformer, a plurality of cylinders arranged in a fixed relation to each other, pistons in said cylinders, means rigidly connecting said pistons together, means for introducing water under pressure into said cylinders behind the pistons, a conductor connected to the front end of said cylinders, means for varying the number of cylinders in communication with said conductor and means for preventing the pressure in said conductor from reaching the disconnected cylinders.

14. In a pressure transformer, a plurality of cylinders arranged in a fixed relation to each other, pistons in said cylinders dividing the cylinders into front and rear chambers, means rigidly connecting said pistons together, a power water pipe connected to said rear chambers, a slack water pipe connected to said front and rear chambers, a discharge pipe connected to said front chambers, and valves between said conductors and said chambers, said valves being operated mechanically to permit water to pass into said chambers, and being operated automatically, to allow water to pass out of said chambers.

15. A pressure transformer comprising a plurality of cylinders arranged in a fixed relation to each other, ports at the opposite ends of said cylinders, a piston in each of said cylinders dividing each cylinder into forward and rear chambers, means rigidly connecting said pistons together, a power pipe, a slack water pipe and a press pipe connected to said ports, valves for controlling the flow of water between said cylinders and said pipes, and means adapted to operate said valves to successively establish communication between the power pipe and the successive rear chambers of said cylinders.

16. A pressure transformer comprising a plurality of cylinders arranged in a fixed relation to each other, connected pistons engaging in said cylinders, means for introducing and discharging water to and from the opposite ends of said cylinders, valves controlling the inlet and discharge to and from said cylinders, means for operating said valves, and means for adjusting the position of said operating means to vary the succession in which the valves are operated.

In testimony whereof, I have hereunto set my hand at Oakland, California, this 17 day of August 1912.

GEORGE A. PETERSON.

In presence of—
 EDWIN W. WOODWARD,
 JOS. A. COLQUHOUN.

Copies of this patent may be obtained for five cents each, by addressing the "Commissioner of Patents. Washington, D. C."